Patented Apr. 18, 1950

2,504,835

UNITED STATES PATENT OFFICE 2,504,835

RESIN FOR STABILIZING TEXTILES AND PROCESS OF MAKING THE SAME

Philip Stanley Hewett, Royal Oak, and Ralph E. Carter, Wayne County, Mich., assignors to Reichhold Chemicals, Inc., Detroit, Mich.

No Drawing. Application August 23, 1946, Serial No. 692,696

6 Claims. (Cl. 260—64)

This invention relates to improved methylol ketone resins especially adapted for the treatment of cellulosic textile materials, and more particularly to the preparation of ketone formaldehyde water soluble and/or dispersible resins possessing unique and desirable properties.

Our invention as set forth in the present application relates to the formation of a resinous condensation product by suitably reacting an aldehyde, particularly aqueous formaldehyde, and certain types of ketones, particularly aliphatic and hydroaromatic ketones. The process possesses marked advantages over anything known in the prior art from the standpoint of efficiency of manufacture, and the resulting product also possesses characteristics not disclosed in the prior art. One of the characteristic properties of our improved resinous product is its ability to dimensionally stabilize cellulosic textile compositions.

In accordance with this invention a thermosetting product may be prepared by reacting 2.0 mols to 5 mols of formaldehyde in aqueous solution with one mol of a ketone from the general class of aliphatic ketones represented by acetone, methyl ethyl ketone, diethyl ketone, methyl isobutyl ketone, or the class of hydroaromatic ketones represented by cyclohexanone. These materials may be used alone or mixtures of two or more ketones may be used to produce resins having a desired range of properties. Formaldehyde producing substances such as paraformaldehyde may be used without departing from this invention.

The formaldehyde is preferably reacted with the ketone or mixture of ketones in the presence of a nonvolatile alkaline catalyst in aqueous solution. The preferred catalysts are sodium carbonate, potassium carbonate, sodium hydroxide, and potassium hydroxide, but other alkaline catalysts may be employed. The catalyst is added in such a manner as to maintain the pH between 8 and 10 during the initial reaction. The initial stage of the reaction is carried on by heating the aldehyde and ketone in the presence of the catalyst to a temperature above 40° C. The length of time for completion of the initial condensation reaction will vary depending on the temperature, the reactivity of the ketone used in the condensation, the ratio of formaldehyde to ketone, and the degree of condensation desired in the finished product. Using low molecular aliphatic ketones such as acetone and methyl ethyl ketone this time has been found to be 3 to 5 hours at 45 to 65° C.

The final or dehydration stage is most conveniently carried on under vacuum. In this stage the condensation is carried further and a portion of the water and the unreacted materials are removed. In practicing our invention we have found it best to concentrate the solution to between 60 and 75% solids. Minor variations in this range may be resorted to without departing from the spirit of this invention.

The resin produced when employed in conjunction with an alkaline catalyst has among other things found application in the dimensional stabilization of textiles. These resinous condensation products have been found superior to other products previously disclosed because of their greater uniformity, greater ease of manufacture and application, and their more desirable chemical and physical properties.

The process and products of the present invention are characterized by the following important features:

1. The effective range of composition is at a ratio of 2.0 to 5 mols of formaldehyde in aqueous solution to 1 mol of ketone. Ratios of below 2.0 have been found to produce resins of inferior quality which are often thermoplastic instead of thermosetting in nature.

2. The use of alkaline catalysts in such amount as to maintain the pH of the resin cook at between a pH of 8 and a pH of 10. Larger amounts of catalyst tend to produce discoloration of the resin.

3. The condensate size of the resin disclosed may be closely controlled by suitable adjustment of the pH of condensation and the reaction time and temperature.

4. Materials prepared according to this specification have a definite resinous structure and are characterized by the fact that they retain sufficient available unreacted methylol groups or loosely bound formaldehyde to further condense with themselves and/or react with textiles and cellulosic compositions. We have found it advantageous for the completed resin to retain in excess of 5% of unreacted methylol groups or loosely bound formaldehyde as determined by the well known sulfite method.

5. Resins prepared according to this disclosure have been manufactured uniformly in production batches of to 20,000# in size. The process disclosed is commercially practical and does not involve holding the material for prolonged periods at low temperature thus representing a distinct advance over prior art.

6. The resin prepared is stable and can be packaged, shipped, and stored for prolonged periods at normal temperature.

7. Formaldehyde and other gases given off by this resinous composition when used in industrial applications on such things as textiles are in small enough quantity to be carried away by the ventilating systems normally employed around such machines and have not been found to be objectionable.

8. Textiles treated with resins prepared according to this specification show remarkable dimensional stability, a good hand, and have been found to be non-chlorine retaining when subsequently washed in solution containing bleaching agents.

9. This resin can be applied to textiles in the normal manner and when properly catalyzed cures in less than five minutes after the moisture is removed from the cloth.

10. Textiles treated with this resin require no additional after-treatment other than that which is normally used in processing the fabric.

This invention will be more readily understood by reference to the accompanying specific examples.

*Example 1*

438 g. acetone
1825 g. formaldehyde (37% aq. solution)
5 g. sodium carbonate

The acetone and formaldehyde were weighed into a 3-necked 3-liter flask and heated to 40° C. under reflux and with mechanical agitation. The sodium carbonate was added at such a rate that the pH was maintained between 8 and 9. After all catalyst was added the solution was heated for 2 hours at 65° C. It was then vacuum dehydrated until a total of 1150 g. of distillate had been removed. The resulting clear, water-white resin solution was found to be 70% N. V. and had a visc. of Q-R (Gardner-Holdt).

*Example 2*

720 g. methyl ethyl ketone
1620 g. formaldehyde (37% aq. solution)
30 g. potassium carbonate The methyl ethyl ketone and formaldehyde were placed in 3-necked 3-liter flask provided with a reflux condenser and equipped with mechanical agitation and the potassium carbonate was added in 3 portions at one hour intervals to maintain the pH at a value around 9. The temperature was maintained at 45-50° C. by means of a water bath. At the end of 3 hours the solution was vacuum dehydrated until 1100 g. of distillate had been removed. The resulting resin was clear water-white and had a visc. of R-S (Gardner-Holdt) at 63% non-volatile.

*Example 3*

350 g. acetone
150 g. methyl isobutyl ketone
1825 g. formaldehyde (37% aq. solution)
7 g. potassium carbonate All above materials added to 3-necked 3-liter flask provided with a reflux condenser and equipped with mechanical agitation and reacted at pH of 8-10 at 50°-55° C. for five hours then vacuum dehydrated until 1200 g. of distillate had been removed. The resulting resin was clear, water-white and had a visc. of L-N (Gardner-Holdt) at 63% solids.

We claim:

1. A process as set forth in claim 1 wherein the ketone has an alkyl radical.

2. A process as set forth in claim 1 wherein the ketone has a hydro-aromatic radical.

3. A process as set forth in claim 1 wherein the ketone is acetone.

4. A process as set forth in claim 1 wherein an alkyl ketone and formaldehyde are employed and the initial reaction is continued for from 3-5 hours at 45-65° C.

5. A resinous product produced according to claim 1 characterized by its ability to dimensionally stabilize cellulosic textile compositions.

6. A process for preparing a clear, stable, water white and water soluble or dispersible resinous condensation product capable of dimensionally stabilizing cellulosic textile materials, which process comprises initially substantially completely reacting a saturated ketone selected from a group consisting of aliphatic and hydro-aromatic ketones with formaldehyde in aqueous solution in the proportion of 2-5 mols of formaldehyde to 1 mol of ketone in the presence of a non-volatile alkaline catalyst at a temperature of from 40° C. to 65° C. for a period of two to five hours and maintaining a pH of 8-10 throughout the initial reaction stage, then immediately and without neutralization dehydrating the reaction product under vacuum to from about 60 to 75% solids to form a condensed resinous product, the ketone and formaldehyde constituting the sole reacting ingredients.

PHILIP STANLEY HEWETT.
RALPH E. CARTER.

REFERENCES CITED

The following references are of record in the file of this patent:

UNITED STATES PATENTS

| Number | Name | Date |
| --- | --- | --- |
| 1,514,508 | Ellis | Nov. 4, 1924 |
| 1,716,542 | Ellis | June 11, 1929 |
| 2,159,875 | Zwicky et al. | May 23, 1939 |
| 2,191,802 | Novotny | Feb. 27, 1940 |
| 2,237,325 | Balz | Apr. 8, 1941 |
| 2,386,321 | Kroeger et al. | Oct. 9, 1945 |
| 2,388,410 | Haury | Nov. 6, 1945 |
| 2,390,481 | Whitner | Dec. 4, 1945 |

OTHER REFERENCES

Ser. No. 340,225, Nata (A. P. C.), published April 20, 1943.

Certificate of Correction

April 18, 1950

Patent No. 2,504,835

PHILIP STANLEY HEWETT ET AL.

It is hereby certified that errors appear in the printed specification of the above numbered patent requiring correction as follows:

Column 4, line 23, for the claim number "6" read 1; and for the claims now numbered 1 to 5, inclusive, read 2, 3, 4, 5 and 6 respectively;

and that the said Letters Patent should be read with these corrections therein that the same may conform to the record of the case in the Patent Office.

Signed and sealed this 11th day of July, A. D. 1950.

[SEAL]

THOMAS F. MURPHY,
*Assistant Commissioner of Patents.*